United States Patent [19]

Kelly

[11] Patent Number: 5,046,963

[45] Date of Patent: Sep. 10, 1991

[54] ELECTRICAL POWER DISTRIBUTION SYSTEM

[76] Inventor: Steven M. Kelly, Box 139, Cromwell, Ind. 46732

[21] Appl. No.: 591,245

[22] Filed: Oct. 1, 1990

[51] Int. Cl.[5] .................. H01R 25/06; H01R 25/16
[52] U.S. Cl. .................................. 439/211; 439/215
[58] Field of Search ............... 439/92, 211, 207, 215, 439/214

[56] References Cited

U.S. PATENT DOCUMENTS

| | | | |
|---|---|---|---|
| 4,740,167 | 4/1988 | Millaimes et al. | 439/92 |
| 4,775,328 | 10/1988 | McCarthy | 439/211 |
| 4,781,609 | 11/1988 | Wilson et al. | 439/215 |
| 4,952,164 | 8/1990 | Weber et al. | 439/215 |

Primary Examiner—Eugene F. Desmond
Attorney, Agent, or Firm—Roger M. Rickert

[57] ABSTRACT

An improved electrical distribution system with two, four wire, multiwire branch circuits providing two sets of single phase office power circuits in exactly two types of duplex outlets. In each duplex outlet, receptacles are split to offer power from different phases. Each type of duplex has its own neutral and ground wires. These two duplexes control neutral balance and eliminate the previous need for oversized neutrals. Therefore, exactly two types of duplexes may be permanently prewired to a modular symmetrical channel providing user access to all four available circuits. The two multiwire branch circuits may be shielded to isolate clean computer power in one of the two duplex types.

13 Claims, 1 Drawing Sheet

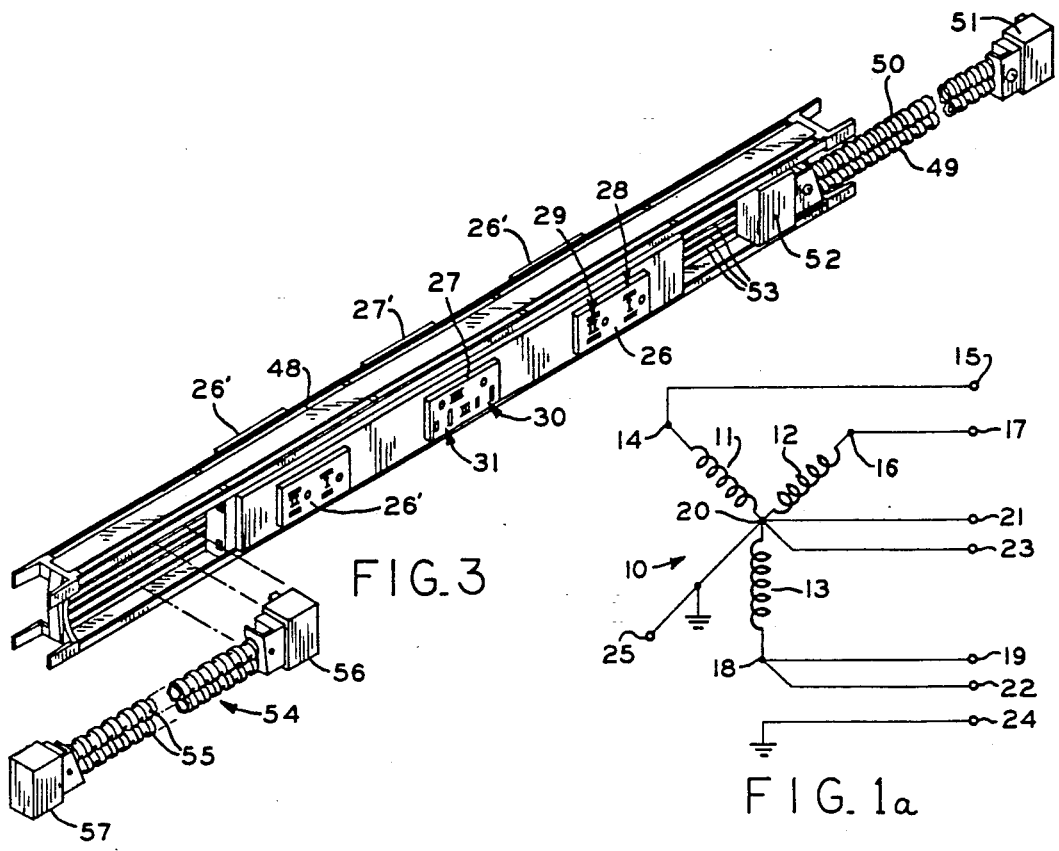
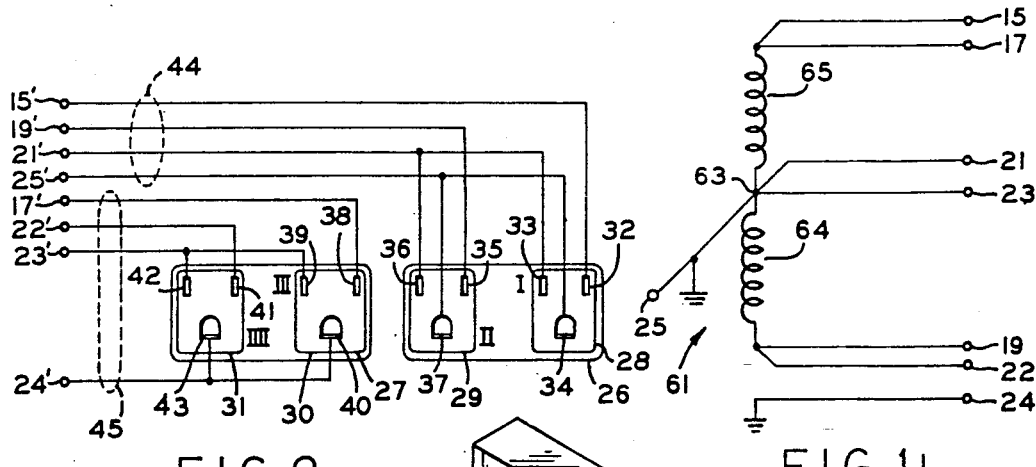
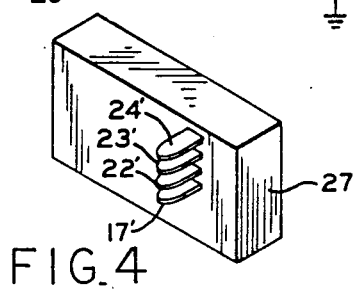

ELECTRICAL POWER DISTRIBUTION SYSTEM

TECHNICAL FIELD

The invention relates to an improved electrical power distribution system and more particularly to a multiple multiwire circuit electrical power distribution system consisting of modular components which connect in a configuration for balancing single and three phase electrical loads over the individual neutrals of the circuit. The invention further provides most economical user access to all circuits.

BACKGROUND ART

Modern offices, for example, may consume large amounts of electricity for operating equipment such as desktop computers, word processors, calculators, electric pencil sharpeners, facsimile machines, sound systems, coffee makers and the like. Various techniques are used for distributing electrical power in an office. For example, several duplex outlets may be hard wired in a single circuit to a circuit breaker. However, there is a relatively low limit on the number of outlets which can be connected in each circuit. Today's electrical code limits a circuit to 13 single and duplex outlets. For many newer installations, modular components are now being used to simplify the installation of wiring. These components include duplex outlets connected through flexible cables to connectors which are plugged into a power distribution box.

In some offices, prefabricated wall panels are used to define separate office spaces. The prefabricated wall panels may be permanently installed or may be movable partitions and frequently include factory installed electrical outlets or a power distribution track. channel or raceway which supplies power to individual or duplex outlets. In some cases, several electrical circuits are carried by a channel to which outlets are attached either at fixed locations or at random locations. Such an arrangement is shown, for example, in U.S. Pat. No. 4,688,869. Different single and duplex outlet configurations are manufactured for electrically engaging different circuits when attached to the channel. Duplex outlets have been designed so that the two individual receptacles connect either to the same circuit or to two different circuits to distribute the electrical load. When four separate circuits are provided in a power distribution channel, ten different split duplex outlet combinations have been required to allow for the different possible combinations of connections of the two receptacles in a duplex outlet to the four circuits. Specifically, if the four circuits are designated I, II, III and IIII, the circuit connection options for the split duplex outlets are: I-I, II-II, III-III, IIII-IIII, I-II, I-III, I-IIII, II-III, II-IIII, and III-IIII. These combinations, in removable receptacle modules, have been necessary to enable user access to circuits while electricians attempted to balance neutral loads. There is a risk with this type of system that the loads will not be equally distributed between the four circuits and that shared neutral conductors will be forced to carry the imbalance between the circuits. Further, there is a risk that electrical noise producing loads will be placed in the same circuit as electrical noise sensitive loads. Circuit connection options are further confused by the choice of two neutrals and two grounds.

In order to handle power requirements in offices, single or three phase power is sometimes used in wall panels to provide preferably four separate single phase circuits commonly via multiwire branch circuits. In the single phase case, the neutral terminal typically corresponds to the center tap on the secondary of a step-down transformer. There are two 120 volt circuits 180 degrees out of phase and the net current flow in the neutral remains low so long as the loads on the two circuits remain fairly well balanced. The three phase power includes a single neutral terminal and three individual terminals which form three separate single phase circuits with the neutral. Typically, 12 gauge wire is connected to the three terminals. Because three balanced load circuits are 120 degrees out of phase from each other, a 12 gauge neutral wire will be adequate if the loads on the three circuits are nearly balanced. However, an unusual imbalance from one circuit can be caused by electronic equipment such as desktop computers. The imbalance can alter raw power and place non-synchronized loads on the shared neutral wire. When the loads from the different phases harmonize, harmonic imbalance can overload the neutral wire. Consequently, a single "super" neutral wire of an oversized 10 gauge wire is now commonly used to supply the three circuits in an office to carry overloads in the neutral wire. The use of duplex outlets connected to different circuits did not eliminate the need for a super neutral because the single neutral is shared by all three circuits.

DISCLOSURE OF THE INVENTION

According to the invention, an improved multiwire branch circuit electrical power distribution system is designed to more uniformly distribute the neutral loads and to control the possibility of harmonic or other imbalance which would otherwise necessitate a super neutral. It enables previously cumbersome receptacle choices to be greatly simplified and permanently attached. The system preferably operates with four circuits, three of which are connected to separate phases of a three phase power system. The fourth is connected to phase I or II. Two separate neutral wires are provided. The system uses only two types of split duplex outlets, each having two receptacles. The two receptacles in each duplex outlet are connected to one neutral wire and to two different out of phase circuits. With three phase, only one phase is common between the two duplex outlets. The two duplex outlets are used to distribute the electrical load from the three phase circuit. Consequently, four adjacent receptacles on two adjacent duplex outlets are connected to four separate circuits, three of which are on three different phases. Preferably, the receptacles are labeled to indicate the circuit so that electrical noise generating equipment can be operated from the same circuit and electrical noise sensitive equipment can be operated from a different, noise free circuit. The electrical loads can be balanced using two different duplex outlets in place of the ten different duplex outlets used in the prior art. Because the two duplex outlets have different neutral wires, there is no risk of harmonic overload of the neutral wires. Consequently, each neutral wire is of the same gauge as the other wires connected to the receptacles.

Further, it is no longer necessary for receptacles to be modular and removable because neutral balance and circuit access are assured Only two types of preferably duplex receptacles may be preferably permanently attached to one or both sides of a factory prewired channel.

Accordingly, it is an object of the invention to provide an improved electrical power distribution system for operating multiwire branch circuits from a power source without the use of a super neutral wire or the need for removable duplex receptacles.

Other objects and advantages of the invention will be apparent from the following detailed description and the accompanying drawings.

BRIEF DESCRIPTION OF THE DRAWING

FIG. 1a is a schematic diagram of a three phase power source for supplying power to four circuits in an electrical power distribution system according to the invention;

FIG. 1b is a schematic diagram of a less frequently used single phase power source for supplying power to four circuits in an electrical power distribution system according to the invention;

FIG. 2 is a schematic diagram of two duplex outlets arranged according to the invention for connection to the power sources of FIGS. 1a or 1b;

FIG. 3 is a partially exploded perspective view of a wiring channel with duplex outlets preferably permanently attached according to the invention; and FIG. 4 is a perspective view of an exemplary duplex outlet showing the side not visible in FIG. 3.

BEST MODE FOR CARRYING OUT THE INVENTION

The invention is directed to an electrical power distribution system for operating from a multiwire branch circuit power source 10 arranged into four circuits as is illustrated in FIG. 1a. The power source 10 is illustrated as a transformer having three wye connected windings 11, 12 and 13. The winding 11 has an end 14 connected to a terminal 15, the winding 12 has an end 16 connected to a terminal 17, and the winding 13 has an end 18 connected to a terminal 19. Opposite ends of the windings 11-13 are connected to a grounded common or neutral point 20 and thence to a terminal 21. For one of the windings 13, the end 18 is connected to a second terminal 22 to establish a fourth circuit and the common point 20 is connected to a second terminal 23. Suitable circuit breakers may be provided between the winding ends 14, 16 and 18, and the connected terminals 15, 17, 19 and 22 to provide the desired degree of over-current protection for each circuit. Smaller supplemental fuses commonly protect subsequent loads. Because the power source 10 is of the three phase type, the voltages across each of the windings 11-13 will be equal and the AC voltage on each of the windings will be 120 degrees out of phase with the voltages across the other two windings 13. The power supply 10 also is provided with two terminals 24 and 25 connected directly to ground. FIG. 1b depicts the single phase version of a multiwire branch circuit power source suitable for the practice of the present invention. The multiwire branch circuit power source of FIG. 1b is less frequently used for office power, however, it is a direct substitute for the multiwire branch circuit power source of FIG. 1a. A secondary winding 61 of a step-down transformer has a center tap 63 which connects to the neutral wires 21 and 23, thus dividing the 240 volt secondary winding into two 120 volt portions 64 and 65. Phase 64 supplies power to circuits I and III of FIG. 2. Phase 64 supplies power to circuits II and IIII of FIG. 2.

FIG. 2 is a schematic diagram of two duplex outlets 26 and 27 arranged for connection to the power supply 10 according to the invention. The duplex outlet 26 has two receptacles 28 and 29 which are labeled I and II, respectively, to indicate the circuits to which they are connected. Similarly, the duplex outlet 27 has two receptacles 30 and 31 which are labeled III and IIII, respectively, to indicate the circuits to which they are connected. If desired, the two receptacles 30 and 31 in the duplex outlet 27 may be oriented differently from the two receptacles 28 and 29 in the duplex outlet 26 to facilitate identification of the circuits connected to the duplex outlets 26 and 27. Each receptacle 28-31 has three contacts arranged for engaging a standard three prong plug (not shown). The receptacle 28 has a hot contact 32 for connection to circuit I power, a common contact 33 and a chassis earth ground contact 34. The receptacle 29 has a hot contact 35 for connection to circuit II power, a common contact 36 and a chassis earth ground contact 37. The receptacle 30 has a hot contact 38 for connection to circuit III power, a common contact 39 and an isolated ground contact 40. The receptacle 31 has a hot contact 41 for connection to circuit IIII power, a common contact 42 and an isolated ground contact 43. For the receptacle 28, the hot contact 32 is connected to a terminal 15', the common contact 33 is connected to a terminal 21' and the chassis earth ground contact 34 is connected to a terminal 25'. For the receptacle 29, the hot contact 35 is connected to a terminal 19', the common contact 36 is connected to the terminal 21' and the chassis earth ground contact 37 is connected to the terminal 25'. For the receptacle 30, the hot contact 38 is connected to a terminal 17', the common contact 39 is connected to a terminal 23'∝ and the isolated ground contact 40 is connected to a terminal 24'. Finally, for the receptacle 31, the hot contact 41 is connected to a terminal 22', the common contact 42 is connected to the terminal 23' and the isolated ground contact 43 is connected to the terminal 24'.

The power distribution system is connected to the duplex outlets 26 and 27 with like terminals 15-15', 17-17', 19-19', 21-21', 22-22', 23-23', 24-24' and 25-25' connected together. Consequently, the receptacles 28, 29 and 30 are operated from three different circuits, each having a different phase. The receptacle 31 is operated from a fourth circuit having the same phase as the circuit connected to the receptacle 29. However, it will be appreciated that the receptacles 31 and 28 also may be connected to the same phase power. According to the invention, the two receptacles 28 and 29 in the duplex outlet 26 must be connected to two different phases and are connected to the same common and chassis earth ground circuits. The two receptacles 30 and 31 in the duplex outlet 27 also must be connected to two different phases and are connected to common and isolated ground circuits different from those for the duplex outlet 26. Consequently, the risk of harmonic or other imbalance overloading the wiring for the common circuit is controlled.

The electrical connections between the duplex outlet 26 and the power source 10 may be made directly through a cable 44 and the connection between the duplex outlet 27 and the power source 10 may be made directly through a cable 45, or a single larger cable may be used in place of the cables 44 and 45. Preferably, the connections are made through a power distribution channel of a type described and illustrated in U.S. Pat. No. 4,688,869, the disclosure of which is incorporated herein. FIG. 3 illustrates an exemplary power distribution channel 48. The channel 48 forms a housing which preferably incorporates the duplex outlets 26 and 27. Reference numbers 26' and 27' indicate duplex outlets substantially identical to 26 and 27 respectively, with duplex outlet 27', for example, being fastened to the second side of channel 48. Each duplex outlet has a series of conductive tabs as seen in FIG. 4 which pass between and engage conductor bars in the power distribution channel. The tab pattern determines which outlet terminals are connected to which power circuit. Exactly two different tab patterns and, therefore, two different types of duplex outlet are provided. A preferably isolated pair of cables 49 and 50 extend between a connector 51 which engages the power source 10 or 61 terminals 15, 17, 19, and 21-25 (FIG. 1a or 1b) and a connector (or splices) 52 which joins a plurality of conductors 53 extending the length of the channel 48. The channel 48 is designed to receive, or preferably incorporate, the duplex outlets 26 and 27 at any desired location along its length and/or its opposite sides. When one or more of the duplex outlet 26 are plugged or incorporated into the channel 48, the receptacle contacts 32-37 engage appropriate conductors 53 for connecting each receptacle 28 to circuit I and for connecting each receptacle 29 to circuit II. Similarly, when one or more of the duplex outlets 27 are plugged or incorporated into the channel 48, the receptacle contacts 38-43 engage appropriate conductors 53 for connecting each receptacle 30 to circuit III and for connecting each receptacle 31 to circuit IIII. For balancing the circuit neutral loads, the duplex outlets 26 and 27 are alternated on the channel 48. As illustrated in FIG. 3, the receptacles 28 and 29 in the duplex outlet 26 may have a different orientation from the receptacles 30 and 31 in the duplex outlet 27 to facilitate circuit identification. The receptacles on one of the duplex outlets 27 may, for example, be dedicated for computer use and the receptacles in the other duplex outlet 26 may be dedicated for other utility needs. Preferably incorporated duplex receptacles 26 and 27 only provide necessary access to all four circuits accessed from source 10.

The channel 48 is designed for preferably symmetrical snap fit mounting along the base of a portable room partition (not shown) for use in offices. Preferably, the channel 48 exposes receptacles on either one or both sides of the partition and duplex outlets 26 and 27 may be plugged into from one or both sides of the channel 48 to provide receptacles on one or both sides of the partition. Channel 48 is preferably top to bottom symmetrical. By providing channels centered in a portable room partition, the duplex outlets may be symmetrically arranged on one or both sides of the partition A cable 54 may be used for electrically connecting two of the channels in series. The cable 54 includes one or two cables 55 extending between two connectors 56 and 57. The connector 56 engages an end of the channel 48 for receiving power from the conductors 53. The connector 57 engages the next channel (not shown) either in the same partition as the channel 48 or in an adjacent partition for supplying power to the next channel. It Will be appreciated by those skilled in the art that various modifications and changes may be made in the above described electrical power distribution system without departing from the spirit and the scope of the following claims.

I claim:

1. An improved multiwire branch circuit power distribution system for connection to an AC power source having a grounded neutral terminal and a plurality of live multiwire branch circuit terminals, said system comprising a first duplex outlet having first and second receptacles, a second duplex outlet having third and fourth receptacles, a first conductor means for connecting a first contact in said first receptacle to a first of said live multiwire branch circuit terminals, a second conductor means for connecting a first contact in said second receptacle to a second of said live multiwire branch circuit terminals, a third conductor means for connecting second contacts in said first and second receptacles to said neutral terminal, a fourth conductor means for connecting a first contact in said third receptacle to a third of said live multiwire branch circuit terminals, a fifth conductor means for connecting a first contact in said fourth receptacle to a third of said live multiwire branch circuit terminals and a sixth conductor means for connecting second contacts in said third and fourth receptacles to said neutral terminal.

2. An improved power distribution system as set forth in claim 1, wherein said six conductor means are six wires all of the same gauge.

3. An improved power distribution system as set forth in claim 1, and further including a seventh conductor means connected between ground and a third contact in each of said first and second receptacles, and an eighth conductor means connected between ground and a third contact in said third and fourth receptacles.

4. An improved power distribution system as set forth in claim 3, wherein said conductor means are in a single cable.

5. An improved power distribution system as set forth in claim 3, wherein said first, second, third and seventh conductor means are wires of a first multiwire branch circuit and are in a first cable and said fourth, fifth, sixth and eighth conductor means are wires of a second multiwire branch circuit and are in a second cable.

6. An improved power distribution system as set forth in claim 5, further including connector means for engaging the power source, and wherein said first and second cables each have an end attached to said connector.

7. An improved power distribution system as set forth in claim 6, including a top to bottom symmetrical channel mounting said first and second duplex outlets to a first side thereof, and cable means engaged with said channel for supplying electrical power to additional receptacles.

8. An improved power distribution system as set forth in claim 7 further comprising third and fourth duplex outlets substantially identical to the first and second duplex outlets respectively, said third and fourth duplex outlets mounted to said first side of said channel.

9. An improved power distribution system as set forth in claim 7 further comprising third and fourth duplex outlets substantially identical to the first and second duplex outlets respectively, said third and fourth duplex outlets mounted to a second side of said channel opposite said first side.

10. An improved power distribution system for connection to a three phase AC power source having a grounded neutral terminal and three single phase terminals with each single phase terminal having an AC voltage relative to the neutral terminal which is 120 degrees out of phase from the other two terminals, said system comprising a first duplex outlet having first and second receptacles, a second duplex outlet having third and fourth receptacles, a first conductor means for connecting a first contact in said first receptacle to a first of said three phase terminals, a second conductor means for connecting a first contact in said second receptacle to a second of said three phase terminals, a third conductor means for connecting second contacts in said first and second receptacles to said neutral terminal, a fourth conductor means for connecting a first contact in said third receptacle to the third of said three phase terminals, a fifth conductor means for connecting a first contact in said fourth receptacle to one of said first and second terminals and a sixth conductor means for connecting second contacts in said third and fourth receptacles to said neutral terminal.

11. An improved power distribution system, as set forth in claim 10, and further including a seventh conductor means for connecting between ground and a third contact in each of said first and second receptacles, and an eighth conductor means for connecting between ground and a third contact in said third and fourth receptacles.

12. An improved power distribution system, as set forth in claim 11, wherein said eight conductor means are mounted in a power distribution channel, and wherein said first and second duplex outlets releasably engage said power distribution channel.

13. An improved power distribution system as set forth in claim 10 wherein the power distribution channel comprises a plurality of elongated generally parallel strips of insulating material each adjacent pair of which has a circuit path gap therebetween and a pair of elongated generally parallel conductor bars in each circuit path gap, one to each side thereof juxtaposed with a respective strip; and each duplex outlet has four conductive tabs adapted to pass between and engage selected ones of the conductor bars in the power distribution channel.

* * * * *